(12) United States Patent
Zitzlaff et al.

(10) Patent No.: US 8,403,603 B2
(45) Date of Patent: Mar. 26, 2013

(54) INSERT SEAT ADAPTER

(75) Inventors: Wolfgang Zitzlaff, Kirchheim/Teck (DE); Otto Eder, Kongen (DE); Holger Rusch, Goppingen (DE)

(73) Assignee: CeramTec GmbH, Plochingen (DE)

( * ) Notice: Subject to any disclaimer, the term of this patent is extended or adjusted under 35 U.S.C. 154(b) by 285 days.

(21) Appl. No.: 12/527,001

(22) PCT Filed: Feb. 28, 2008

(86) PCT No.: PCT/EP2008/052420
§ 371 (c)(1), (2), (4) Date: Feb. 19, 2010

(87) PCT Pub. No.: WO2008/104585
PCT Pub. Date: Sep. 4, 2008

(65) Prior Publication Data
US 2010/0316454 A1    Dec. 16, 2010

(30) Foreign Application Priority Data

Feb. 28, 2007 (DE) .......................... 10 2007 010 125

(51) Int. Cl.
*B23C 5/22* (2006.01)
*B23B 27/16* (2006.01)
*B23B 29/12* (2006.01)

(52) U.S. Cl. .................................... 407/107; 407/101

(58) Field of Classification Search .................. 407/40, 407/41, 46–48, 102–105, 101, 107; B23C 5/22; B23B 27/16
See application file for complete search history.

(56) References Cited

U.S. PATENT DOCUMENTS

| | | | | |
|---|---|---|---|---|
| 2,474,643 A * | 6/1949 | Webb | .............. | 76/115 |
| 2,546,455 A * | 3/1951 | Labrozzi et al. | ................ | 407/10 |
| 2,887,760 A * | 5/1959 | Armstrong | ........................ | 407/6 |
| 2,992,472 A * | 7/1961 | Paul | ............................ | 407/107 |
| 3,050,828 A * | 8/1962 | Cashman et al. | .............. | 407/77 |
| 3,059,316 A * | 10/1962 | Berry, Jr. et al. | .............. | 407/101 |
| 3,066,385 A * | 12/1962 | Vana | ............................ | 407/110 |
| 3,102,326 A * | 9/1963 | Conti et al. | ...................... | 407/5 |
| 3,144,795 A * | 8/1964 | Bunnell | ........................ | 82/157 |
| 3,154,974 A * | 11/1964 | Greenleaf | ..................... | 408/153 |
| 3,171,188 A * | 3/1965 | Stier | ................................ | 407/4 |
| 3,172,190 A * | 3/1965 | Beach | .............................. | 407/4 |
| 3,191,261 A * | 6/1965 | Yore | ............................... | 407/77 |
| 3,376,763 A * | 4/1968 | Welles | ......................... | 408/199 |
| 3,484,920 A * | 12/1969 | Werner | ............................ | 407/6 |
| 3,548,475 A * | 12/1970 | Fiori | ................................ | 407/6 |
| 3,935,624 A * | 2/1976 | Weinreich | .................... | 407/103 |
| 4,016,634 A * | 4/1977 | Barnes | ......................... | 407/104 |
| 4,050,127 A * | 9/1977 | Bodem et al. | ................ | 407/107 |
| 4,137,000 A * | 1/1979 | Takacs et al. | ................. | 407/101 |
| 4,309,132 A * | 1/1982 | Adamson et al. | .............. | 407/38 |
| 4,470,732 A * | 9/1984 | Lindsay | ....................... | 407/104 |
| 4,602,899 A * | 7/1986 | Vig | .............................. | 408/153 |

(Continued)

FOREIGN PATENT DOCUMENTS

DE      3425012 A1 *  1/1985
EP      1226891 A1 *  7/2002

*Primary Examiner* — Andrea Wellington
*Assistant Examiner* — Sara Addisu
(74) *Attorney, Agent, or Firm* — Fulbright & Jaworski LLP

(57) ABSTRACT

A tool holder as a carrier tool for a cutting tool for turning, milling or drilling applications for the machining of primarily metal materials, having an incorporated receiving recess with seat walls for receiving a cutting body, wherein the cutting body is fastened with fastening means.

11 Claims, 2 Drawing Sheets

U.S. PATENT DOCUMENTS

| | | | |
|---|---|---|---|
| 4,722,642 A * | 2/1988 | Musacchia, Jr. | 407/85 |
| 4,730,525 A | 3/1988 | Kelm | |
| 5,163,788 A * | 11/1992 | Dahl et al. | 407/46 |
| 5,183,362 A * | 2/1993 | Kuroyama et al. | 407/118 |
| 5,193,945 A | 3/1993 | Nakayama et al. | |
| 5,667,343 A * | 9/1997 | Hessman et al. | 407/36 |
| 6,186,704 B1 * | 2/2001 | Hale | 407/101 |
| 6,273,649 B1 * | 8/2001 | Ziegler | 407/101 |
| 6,736,574 B2 * | 5/2004 | Persson et al. | 407/77 |
| 6,769,843 B2 * | 8/2004 | Hansson | 407/91 |
| 7,163,360 B2 * | 1/2007 | Toyose | 407/36 |
| 7,422,395 B2 * | 9/2008 | Huang | 407/107 |
| 2002/0119017 A1 | 8/2002 | Gates et al. | |
| 2005/0232711 A1 * | 10/2005 | Shaheen | 407/107 |

* cited by examiner

PRIOR ART

INSERT SEAT ADAPTER

This application is a §371 of PCT/EP2008/052420 filed Feb. 28, 2008, and claims priority from DE 10 2007 010 125.4 filed Feb. 28, 2007.

The invention relates to a clamping holder as a carrier tool for a cutting tool for turning, milling and drilling applications in the machining of primarily metallic materials, having an incorporated receiving recess with seat walls to receive a cutting body, with the cutting body being fastened by fastening means.

The prior art for carrier tools (see FIGS. 1 and 2) for machining is constituted by so-called clamping holders 1 having an incorporated receiving recess with plate seat walls 2 for receiving cutting bodies 3, such as cutting plates, also indexable cutting plates or indexable cutting bodies made from ceramic material, CBN/PCD-containing materials or hard metal. CBN stands for cubic boron nitride and PCD signifies polycrystalline diamond.

These cutting bodies 3 are then fastened by means of a screw, wedge or gripping claw 5 and rest against the plate seat walls 2. The gripping claw 5 is fastened on the clamping holder 1 by means of a screw 11. During the machining, after a certain time the inserted cutting edge corner 4 of the cutting body 3 becomes worn and the clamping holder 1 becomes warm. After a defined amount of work, that is, processing quantity, the cutting edge corner 4 is changed by turning the cutting body 3 and thus use is made thereof again for a defined amount of work until all the cutting edge corners 2 that are available are used up. This process can be repeated until the clamping body 1 also shows signs of wear and has to be renewed. This renewal can be effected by build-up welding, holder- and plate-seat-reworking and also by exchanging it generally for a new tool.

The underlying object of the invention is to improve a clamping holder as a carrier tool for a cutting tool for turning, milling or drilling applications in the machining of primarily metallic materials in such a way that its service life is extended and the costs for the whole life cycle of the clamping holder are minimized.

This object is achieved in that fastened in the receiving recess there is a detachable and exchangeable plate seat adapter that is adjusted to the cutting body and which rests with lateral surfaces directly or indirectly against the seat walls in the receiving recess and has plate seat walls against which the cutting body rests.

In accordance with the invention, the plate seat walls that are usually incorporated directly in the clamping holder (see above) are switched for a detachable and exchangeable plate seat adapter that is adjusted to the cutting body. This plate seat adapter is conceived as an exchangeable part and can be changed in the event of wear quickly and inexpensively. The actual clamping holder can be used further, its service life is thereby extended, and the costs are minimized over the whole life cycle of the product.

The plate seat adapter preferably rests with three lateral surfaces directly against three seat surfaces of the receiving recess and is formed in a rectangular manner with its lateral surfaces resting against the seat surfaces. As a result, it can be pushed into the receiving recess that is arranged in the clamping holder.

In an inventive development, the plate seat adapter is formed prismatically with its lateral surfaces resting against the clamping holder and rests against seat surfaces of the receiving recess that are exactly the same.

In an inventive development, the plate seat adapter rests with two lateral surfaces extending in a V-shaped manner directly against seat surfaces of the receiving recess that are exactly the same. Exactly the same seat surfaces means that the seat surfaces match the lateral surfaces, as shown in the figures.

In a formation of the invention, the plate seat adapter is anchored by fastening means, such as, for example, a screw connection or a clamp, on the clamping holder.

As a result of the separation of the clamping holder and the plate seat adapter as two separate components, as a further inventive feature the possibility follows not just of exchanging the plate seat adapter, but also of constructing it, according to operating conditions, from different materials.

In a development, the plate seat adapter consists of high-alloy and heat-treated steels. This gives rise to better wear-protection.

In another development, the plate seat adapter consists of a hot-work steel. This can lead, for example, to specific heat-dissipation and extended resistance of the product.

In another inventive development, the plate seat adapter consists of a ceramic material. Ceramic material has, in comparison with metals, a markedly low level of thermal conductivity. The thermal insulation between the cutting plate, the plate seat adapter and the clamping holder is thus realized by means of a plate seat adapter made from ceramic material.

In another inventive development, the plate seat adapter consists of a heavy metal, such as, for example, Densimet. Plate seat adapters of heavy metal, such as, for example, Densimet, as a result of different mass ratios in the clamping holder and oscillations mutually cancelling each other out give rise to a damping possibility with respect to vibrations that occur during the machining process.

In another development of the invention, the plate seat adapter consists of a combination of various materials.

In an inventive development, arranged between the lateral surfaces of the plate seat adapter and the seat surfaces of the receiving recess there are elements that have special properties for thermal conduction, damping, or electrical or thermal insulation. In this connection, the plate seat adapter does not then rest against the seat walls in the receiving recess directly, but indirectly by way of the elements.

In order to fasten the cutting body with a gripping claw, in an inventive development incorporated in the plate seat adapter there is a bore for the fastening screw of the gripping claw, preferably with lateral grooves for securement of the gripping claw against rotation.

Whilst the plate seat adapter in accordance with the invention is an exchangeable portion, by means of a suitable choice of material it is additionally possible to achieve therewith those advantages that have been described, such as heat dissipation, thermal insulation, damping etc.

Further features of the invention are shown in the figures that are described in the following.

BRIEF DESCRIPTION OF THE DRAWINGS

FIG. 3 shows a complete clamping holder 1 with a plate seat adapter 6 pushed in and a cutting body 3 inserted, with the cutting body 3 being fixedly fastened on the clamping holder 1 by means of a gripping claw 5 which is anchored with a fastening screw 11 on the clamping holder 1. The clamping holder 1 thus equipped is inserted for the application into a cutting tool (not shown). FIG. 4 shows the same clamping holder 1 as FIG. 3, but with the gripping claw 5 not shown for the sake of a better illustration. FIG. 6 shows the same clamping holder 1 as that shown in FIGS. 3 and 4 without the plate seat adapter 6, without the cutting body 3 inserted, without the gripping claw 5 and without the fastening screw 11.

Figure 1:
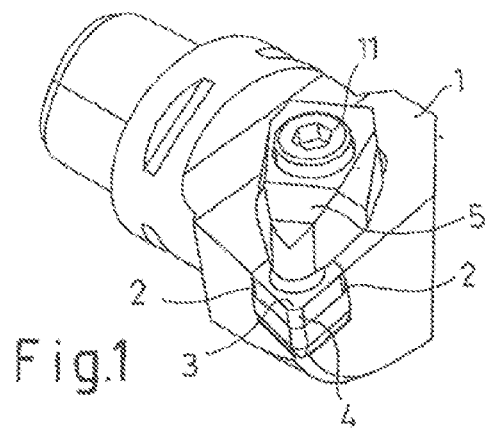
FIGS. 1 and 2 show the prior art as explained in the introduction to the description.
Figure 2:
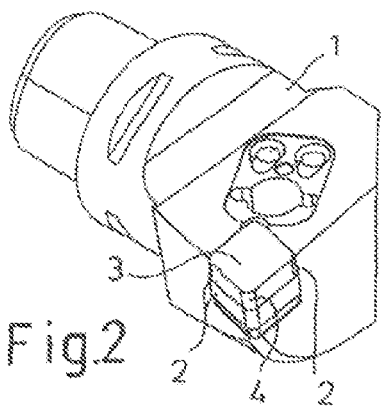
Figure 3:
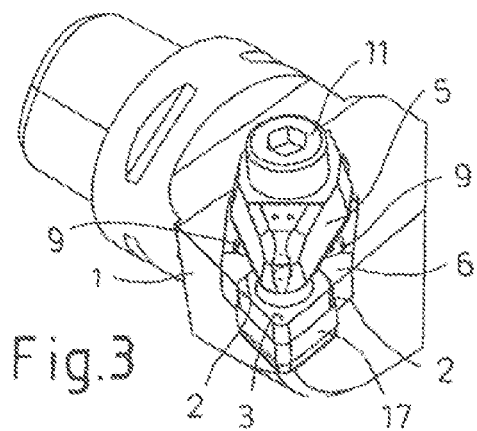
FIGS. 3 to 4 show an embodiment of a clamping holder 1 in accordance with the invention as a carrier tool for a cutting tool for turning, milling and drilling applications in the machining of primarily metallic materials.
Figure 4:
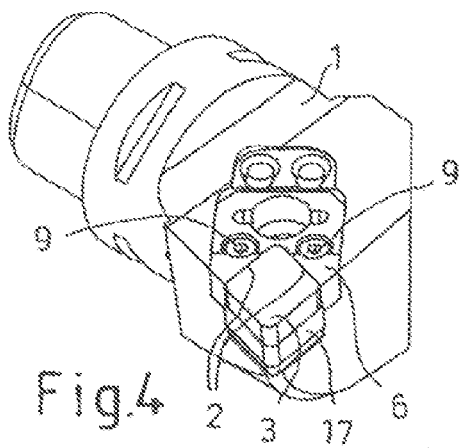

Incorporated in the clamping holder 1 there is a receiving recess 8 with three seat walls 13 which are preferably arranged at right angles to each other. Depending on the plate seat adapter or its task, seat walls that are matched to each other prismatically can be advantageous. On the base of the receiving recess 8 a bore 14 is incorporated with a thread which is used to anchor the gripping claw 5 with a fastening screw 11. Moreover, mostly two bores 15 are incorporated with respective threads in order to fasten the plate seat adapter 6 with screws 9. The receiving recess 8 has at its end facing the cutting body 3 a supporting-plate recess 16 which is used to receive a supporting plate 17 for the cutting body 3. This supporting-plate recess 16 can also be omitted depending on the clamping holder. This is necessary, for example, when spatial relationships for the internal processing of work-piece bores are tight. The two seat faces 18 of the supporting-plate recess 16 are usually constructed at right angles or at angles of more than 90° to each other. The clamping holder 1 consists of a metal.

Figure 5:
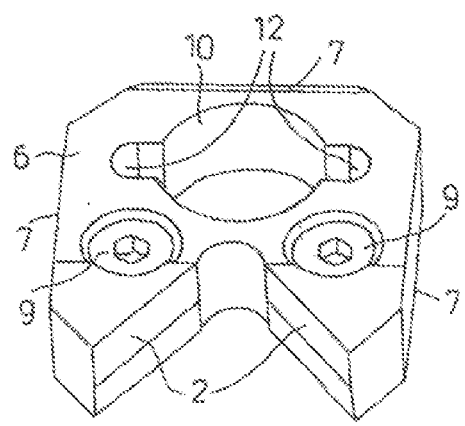
FIG. 5 shows a view of the plate seat adapter 6.
Figure 6:
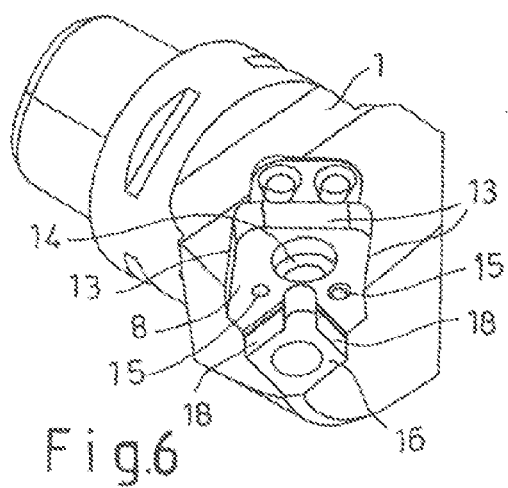
FIG. 6 shows the same clamping holder 1 as shown in FIGS. 3 and 4 without the plate seat adapter 6, the cutting body 3 inserted, the gripping claw 5 and the fastening 11.

A plate seat adapter 6 is pushed into the receiving recess 8 (see FIG. 5). The plate seat adapter 6 is preferably formed in a rectangular manner and has lateral surfaces 7 that are arranged at right angles to each other. The rectangular formation can, depending on the application, also have a prismatic form and the lateral surfaces 7 can even assume a non-rectangular shape. For example, by means of a so-called dovetail form of the receiving recess 8 and the plate seat adapter 6 it is possible to achieve a form-locking connection in accordance with the invention. The bores 15 and the screws 9 would then be inapplicable. The cutting pressure during the machining would be effected by a strike of the plate seat adapter 6 against the wall 13 located at the rear in the receiving recess 8. The plate seat adapter 6 is prevented from falling out forwards by means of the gripping-claw screw 11 (this version is not shown here). The lateral surfaces 7 are bevelled at the respective corners. Incorporated in the centre of the plate seat adapter 6 there is a continuous bore 10 which after the adapter has been pushed into the receiving recess 8 is arranged in alignment above the bore 14 so that the gripping claw 5 projecting through the bore 10 can engage into the bore 14 with the thread. In order to secure the gripping claw against rotation, the bore 10 has lateral grooves 12 into which there engage lateral cross-pieces on the gripping claw 5. In addition, two bores are incorporated in the plate seat adapter 6 so that the plate seat adapter 6 can be fastened with screws 9 on the clamping holder 1 by way of the bores 15 with thread. On the face towards the cutting body 3, the plate seat adapter 6 has two plate seat walls 2 that are arranged at angles to each other for the cutting body 3 to rest against with an accurate fit. The angle (here)80°, which the plate seat walls 2 have with respect to each other, corresponds to the angle which the cutting edges of the cutting body 3 have with respect to each other. After the plate seat adapter 6 has been pushed into the receiving recess 8, the plate seat walls 2 lie in alignment above the seat surfaces 18 of the supporting-plate recess 16, if the latter is provided.

After the plate seat adapter 6 has been pushed into the receiving recess 8 (the supporting plate 17 is already anchored here in the supporting-plate recess 16), the plate seat adapter 6 is anchored with the screws 9. Subsequently, the cutting body 3 is inserted in such a way that its cutting edges rest against the plate seat walls 2 of the plate seat adapter 6. Finally, the gripping claw 5 is set thereon and anchored with the fastening screw 11, whereby the cutting body 3 is fastened at the same time.

In order to exchange the plate seat adapter 6, the procedure is the reverse. In order to exchange the cutting body 3, only the fastening screw 11 needs to be undone and the gripping claw 5 lifted.

Figure 7:
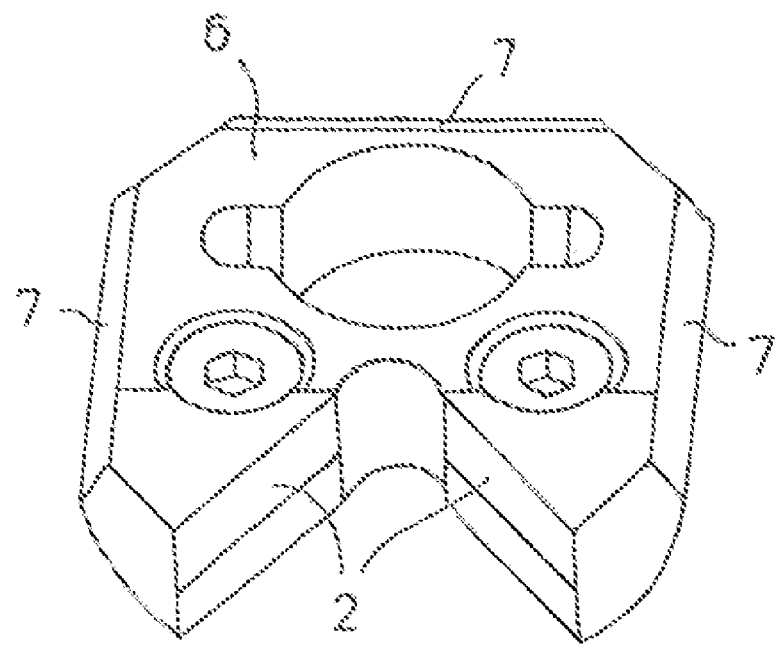
FIGS. 7 and 8 show a plate seat adapter 6 that has prismatic lateral surfaces 7.
Figure 8:
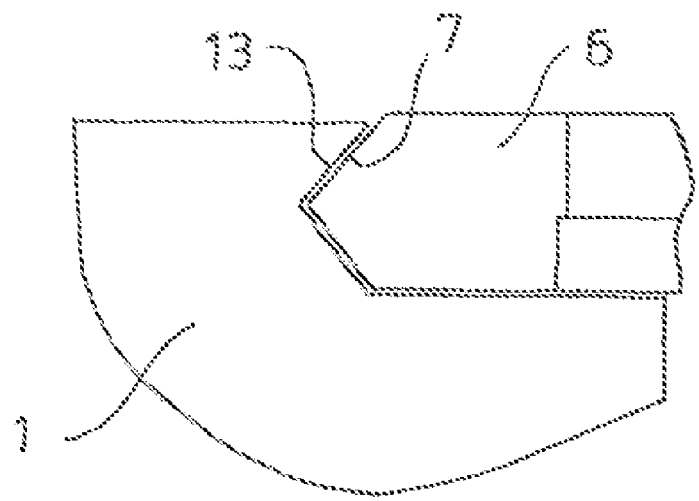

In FIGS. 7 and 8, a plate seat adapter 6 is shown that has prismatic lateral surfaces 7. Otherwise, this plate seat adapter 6 is identical with that shown in FIG. 5. FIG. 8 shows the prismatic lateral surfaces 7 and the plate seat adapter 6, where the plate seat adapter 6 is inserted into clamp holder 1. These prismatic lateral surfaces 7 are formed so that they are V-shaped in section, as can easily be seen in FIG. 8. The seat surfaces 13 of the receiving recess 8 must be adjusted to the prismatic form of the lateral surfaces 7.

The invention claimed is:

1. A clamping holder as a carrier tool for a cutting tool for turning, milling or drilling applications in the machining of primarily metallic materials, having an incorporated receiving recess with seat walls to receive a cutting body, with the cutting body being fastened by fastening means, wherein fastened in the receiving recess there is a detachable and exchangeable plate seat adapter having three lateral surfaces that directly abut against three vertical seat walls in the receiving recess and has plate seat walls against which the cutting body rests, and wherein each of the three vertical lateral surfaces extend in a V-shaped manner and directly rest against the three seat walls of the receiving recess having a matching V-shape.

2. A clamping holder according to claim 1, wherein the plate seat adapter rests against the clamping holder with it lateral surfaces, wherein the portion of the plate seat adapter resting against the clamping holder is formed in a rectangular shape.

3. A clamping holder according to claim 2, wherein a bore for the fastening screw of a gripping claw is incorporated in the plate seat adapter.

4. A clamping holder according to claim 1, wherein the plate seat adapter is anchored by a fastener.

5. A clamping holder according to claim 4, wherein the fastener is a screw connection.

6. A clamping holder according to claim 5, wherein a bore for the fastening screw of a gripping claw is incorporated in the plate seat adapter.

7. A clamping holder according to claim 4, wherein a bore for the fastening screw of a gripping claw is incorporated in the plate seat adapter.

8. A clamping holder according to claim 1, wherein the plate seat adapter comprises at least one of a high-alloy and heat-treated steel, a hot-work steel, a ceramic material or a heavy metal.

9. A clamping holder according to claim 8, wherein a bore for the fastening screw of a gripping claw is incorporated in the plate seat adapter.

10. A clamping holder according to claim 1, wherein a bore for the fastening screw of a gripping claw is incorporated in the plate seat adapter.

11. A clamping holder according to claim 10, wherein the bore has lateral grooves for securing the gripping claw against rotation.

* * * * *